United States Patent [19]
Motomura et al.

[11] Patent Number: 6,016,177
[45] Date of Patent: Jan. 18, 2000

[54] MULTI-LAYER CIRCULARLY POLARIZED LIGHT SEPARATION PLATE CONTAINING CHOLESTERIC LIQUID CRYSTAL POLYMER LAYERS

[75] Inventors: Hironori Motomura; Tadayuki Kameyama; Naoki Takahashi, all of Osaka, Japan

[73] Assignee: Nitto Denko Corporation, Osaka, Japan

[21] Appl. No.: 09/087,162

[22] Filed: May 29, 1998

[30] Foreign Application Priority Data

May 29, 1997 [JP] Japan ................................. 9-157685
Mar. 20, 1998 [JP] Japan ................................ 10-092766

[51] Int. Cl.[7] ........................... G02F 1/1335; C09K 19/02
[52] U.S. Cl. ............................ 349/98; 349/175; 349/185
[58] Field of Search ........................... 349/98, 175, 185; 359/492, 500

[56] References Cited

U.S. PATENT DOCUMENTS

| | | | |
|---|---|---|---|
| 3,909,113 | 9/1975 | Stotts | 350/160 |
| 4,725,460 | 2/1988 | Matsuo et al. | 428/1 |
| 5,332,522 | 7/1994 | Chen et al. | 252/299.01 |
| 5,506,704 | 4/1996 | Broer et al. | 349/98 |
| 5,518,653 | 5/1996 | Buchecker et al. | 252/299.61 |
| 5,555,114 | 9/1996 | Narita et al. | 359/65 |
| 5,619,355 | 4/1997 | Sharp et al. | 349/98 |
| 5,627,666 | 5/1997 | Sharp et al. | 349/98 |
| 5,727,107 | 3/1998 | Umemoto et al. | 385/116 |
| 5,796,454 | 8/1998 | Ma | 349/98 |
| 5,825,444 | 10/1998 | Broer et al. | 349/98 |
| 5,841,494 | 11/1998 | Hall | 349/98 |
| 5,844,637 | 12/1998 | Katsumata | 349/98 |

FOREIGN PATENT DOCUMENTS 0 606 939  7/1994  European Pat. Off. .
0 606 940  7/1994  European Pat. Off. .
1-133003  5/1989  Japan .

*Primary Examiner*—William L. Sikes
*Assistant Examiner*—Tarifur R. Chowdhury
*Attorney, Agent, or Firm*—Sughrue, Mion, Zinn, Macpeak & Seas, PLLC

[57] ABSTRACT

Disclosed are a method for producing a circularly polarized separated plate which comprises coating an oriented cholesteric liquid crystal polymer layer with a different kind of cholesteric liquid crystal polymer and heat orienting the resulting coated layer, or heat pressing oriented cholesteric liquid crystal polymer layers on each other, or adhering oriented cholesteric liquid crystal polymer layers to each other through a volatile liquid or a volatile liquid in which a cholesteric liquid crystal polymer is dissolved, thereby forming a close contact laminate of two or more cholesteric liquid crystal polymer layers in which an upper layer is different from a lower layer in helical pitch; a circularly polarized separated plate comprising a close contact laminate of two or more cholesteric liquid crystal polymer layers in which an upper layer is different from a lower layer in helical pitch, the laminate having a mixed layer of cholesteric liquid crystal polymers forming the upper and lower layers, which is different from the upper and lower layers in helical pitch, in a close contact interface thereof to provide multistage changes in helical pitch in the direction of thickness; an optical element in which the circularly polarized separated plate is provided with at least one of a ¼ wavelength plate and a polarizer; a polarization light source device comprising the circularly polarized separated plate or optical element on a light outgoing side of a light pipe; and a liquid crystal display comprising the circularly polarized separated plate, optical element or polarization light source device on a visual back face side of a liquid crystal cell.

20 Claims, 3 Drawing Sheets

MULTI-LAYER CIRCULARLY POLARIZED LIGHT SEPARATION PLATE CONTAINING CHOLESTERIC LIQUID CRYSTAL POLYMER LAYERS

FIELD OF THE INVENTION

The present invention relates to a circularly polarized separated plate and an optical element in which cholesteric liquid crystal polymer layers are laminated with each other in a close contact state, which can form a polarization light source device excellent in the efficiency for light utilization and a liquid crystal display excellent in luminance to give good visibility.

BACKGROUND OF THE INVENTION

Conventionally, circularly polarized separated plates each comprising two or more cholesteric liquid crystal polymer layers different in the wavelength region of reflected light which are adhered to each other have been known in JP-A-1-133003 (the term "JP-A" as used herein means an "unexamined published Japanese patent application"). The lamination of cholesteric liquid crystal layers aims at the enlargement of the wavelength region of reflected light. That is to say, the wavelength ($\lambda$) of light reflected from a cholesteric liquid crystal layer is represented by $n_o p \cos\theta < \lambda < n_e p \cos\theta$, based on the refractive indexes of ordinary light and extraordinary light by birefringence ($n_o$, $n_e$) and the helical pitch (p), taking the angle of incidence as $\theta$.

However, the values of $n_o$ and $n_e$ described above are not so large. The wavelength region of the reflected light is therefore narrower than that of visible light, so that light transmitted through a monolayer cholesteric liquid crystal layer and light reflected therefrom look colored, as called selective reflection or circularly polarized dichromatism. Accordingly, different types of cholesteric liquid crystal polymer layers are laminated to enlarge the wavelength region of the reflected light, thereby forming circularly polarized separated plates showing neutral tints.

Further, the mere lamination of the cholesteric liquid crystal polymer layers only adds the wavelengths of the reflected light. Accordingly, in order to form circularly polarized separated plates, for example, showing reflection characteristics over the entire region of visible light, it is usually necessary to combine three or more types of cholesteric liquid crystal polymer layers so that the wavelength region of the reflected light extends to the entire region of visible light.

SUMMARY OF THE INVENTION

It is therefore an object of the present invention to provide a circularly polarized separated plate in which a plurality of cholesteric liquid crystal polymer layers are laminated through no adhesive layer and which exhibits a wide reflection wavelength region by the lamination of a small number of cholesteric liquid crystal polymer layers.

Another object of the present invention is to provide an optical element and a polarization light source device excellent in the efficiency for light utilization in which the circularly polarized separated plate is used.

A further object of the present invention is to provide a liquid crystal display excellent in luminance to give good visibility.

According to the present invention, there is provided a method for producing a circularly polarized separated plate which comprises coating an oriented cholesteric liquid crystal polymer layer with a different kind of cholesteric liquid crystal polymer and heat orienting the resulting coated layer, or heat pressing oriented cholesteric liquid crystal polymer layers on each other, or adhering oriented cholesteric liquid crystal polymer layers to each other through a volatile liquid or a volatile liquid in which a cholesteric liquid crystal polymer is dissolved, thereby forming a close contact laminate of two or more cholesteric liquid crystal polymer layers in which an upper layer is different from a lower layer in helical pitch.

The present invention further provides a circularly polarized separated plate comprising a direct close contact laminate of two or more cholesteric liquid crystal polymer layers in which an upper layer is different from a lower layer in helical pitch; and a circularly polarized separated plate comprising a close contact laminate of two or more cholesteric liquid crystal polymer layers in which an upper layer is different from a lower layer in helical pitch, said laminate having a mixed layer of cholesteric liquid crystal polymers forming the upper and lower layers, which is different from the upper and lower layers in helical pitch, in a close contact interface thereof to provide multistage changes in helical pitch in the direction of thickness.

The present invention still further provides an optical element in which the above-mentioned circularly polarized separated plate is provided with at least one of a ¼ wavelength plate and a polarizer; a polarization light source device comprising the above-mentioned circularly polarized separated plate or optical element on a light outgoing side of a light pipe; and a liquid crystal display comprising the above-mentioned circularly polarized separated plate, optical element or polarization light source device on a visual back face side of a liquid crystal cell.

According to the production method of the present invention, the circularly polarized separated plate comprising the direct close contact laminate of two or more cholesteric liquid crystal polymer layers in which the upper layer is different from the lower layer in helical pitch can be efficiently produced. Accordingly, reflection loss caused by intervention of an adhesive layer and an increase in thickness can be avoided.

In the circularly polarized separated plate comprising the mixed layer of the cholesteric liquid crystal polymers forming the upper and lower layers in the close contact interface thereof, the helical pitch of the mixed layer shows a mean value of the helical pitch values of the upper and lower layers, so that the laminate of the cholesteric liquid crystal polymer layers changing in helical pitch in multiple stages in the direction of thickness can be formed. Accordingly, when the reflected wavelength region between the upper and lower layers has a discontinuous region, it exhibits reflection characteristics for filling up the discontinuous region to be able to make the reflected wavelength region continuous.

Accordingly, for example, the use of two kinds of cholesteric liquid crystal polymer layers having reflected wavelength regions of 500 nm or less and equal to or more than 600 nm, respectively, can provide a circularly polarized separated plate which also reflects light in the wavelength region of 500 nm to 600 nm, the discontinuous reflected wavelength region. This means that the circularly polarized separated plate showing a wider reflected wavelength region can be formed by lamination of less cholesteric liquid crystal polymer layers.

Further, using the above-mentioned circularly polarized separated plate, the optical element excellent in optical characteristics and the polarization light source device excellent in the efficiency for light utilization can be formed, and the liquid crystal display excellent in luminance to give good visibility can be formed.

DETAILED DESCRIPTION OF THE INVENTION

Figure 1:
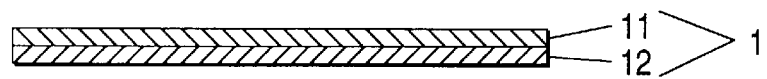
FIG. 1 is a cross sectional view showing one example of the circularly polarized separated plate according to the present invention.
Figure 2:
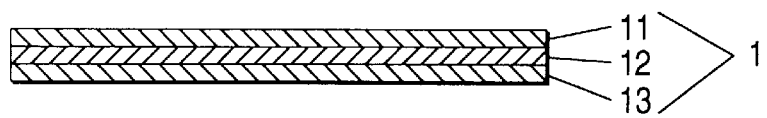
FIG. 2 is a cross sectional view showing another example of the circularly polarized separated plate according to the present invention.

The circularly polarized separated plate according to the present invention comprises a direct close contact laminate of two or more cholesteric liquid crystal polymer layers in which an upper layer is different from a lower layer in helical pitch. Embodiments thereof are shown in FIGS. 1 and 2. The reference numeral 1 indicates a circularly polarized separated plate, and the reference numerals 11, 12 and 13 indicate cholesteric liquid crystal polymer layers.

The direct close contact laminate of two cholesteric liquid crystal polymer layers can be produced, for example, by coating an oriented cholesteric liquid crystal polymer layer with a different kind of cholesteric liquid crystal polymer and heat orienting the resulting coated layer. The close contact laminate of three or more cholesteric liquid crystal polymer layers can be produced by repeating the above-mentioned procedure comprising coating the cholesteric liquid crystal polymer layer with the above-mentioned cholesteric liquid crystal polymer and heat orienting the resulting coated layer.

In the above, in order to obtain the circularly polarized separated plate excellent in optical characteristics such as selective reflection and the efficiency for light utilization, it is preferred that the previously oriented cholesteric liquid crystal polymer layer to be coated with another cholesteric liquid crystal polymer shows a mirror reflection fraction of 60% or more, preferably 65% or more, and more preferably 70% or more. The term "mirror reflection fraction" as used herein means a ratio of mirror reflection components (components in the direction of regular reflection) to the total reflected light selectively reflected, and it is calculated by (mirror reflectance/total reflectance)×100.

Further, in respect to the efficiency of orientation by lamination, it is preferred that cholesteric liquid crystal polymers different from the cholesteric liquid crystal polymers constituting the previously oriented layers only in the ratios of optically active carbon atoms, such as asymmetric carbon atoms, mesogen groups, chiralities and chiral components, are used as the cholesteric liquid crystal polymers of another kind, and that they are applied as 10 to 50% solutions.

Furthermore, in terms of formation of highly oriented laminated layers, it is preferred that the coated layers of the cholesteric liquid crystal polymers of another kind are dried with air having a temperature of 30° C. or less to reduce the residual solvent amount to 20% or less, and that the coated layers of the cholesteric liquid crystal polymers in such a dried state are then subjected to a heat orientation treatment.

On the other hand, other methods for producing the direct close contact laminate of two or more cholesteric liquid crystal polymer layers include a procedure of adhering a specified number of two or more oriented cholesteric liquid crystal polymer layers to each other by heat pressing, and a procedure of adhering a specified number of two or more oriented cholesteric liquid crystal polymer layers to each other through a volatile liquid or a volatile liquid in which a cholesteric liquid crystal polymer is dissolved.

In the above, for the heat pressing treatment, an appropriate method can be employed such as a method of heat pressing cholesteric liquid crystal polymer layers by means of a heat pressing means such as a roll laminator at a temperature equal to or higher than a glass transition temperature to lower than an isotropic phase transition temperature.

On the other hand, as the volatile liquids used between the cholesteric liquid crystal polymer layers, alcohols which can swell or dissolve the cholesteric liquid crystal polymers, and appropriate ones which are used as solvents for the cholesteric liquid crystal polymers, such as hydrocarbons, ethers and ketones can be used. Especially, in respect to maintenance of the oriented state, low-soluble volatile liquids are preferably used in which the solubility of the cholesteric liquid crystal polymers is 20% by weight or less.

As the liquid crystal polymers dissolved in the volatile fluids, appropriate ones may be used. Especially, from the viewpoint of adhesion between the cholesteric liquid crystal polymer layers, one or both of the cholesteric liquid crystal polymers forming the upper and lower layers are preferably used. An appropriate method such as a coating method or a spraying method can be employed for applying the volatile fluids between the cholesteric liquid crystal polymer layers.

The circularly polarized separated plate is formed as a combination of cholesteric liquid crystal polymer layers in which the upper layer is different from the lower layer in helical pitch. Accordingly, the circularly polarized separated plate can be formed as a laminate comprising two or more cholesteric liquid crystal polymer layers having the same helical pitch. In this case, however, between the cholesteric liquid crystal polymer layers having the same helical pitch intervene one or more cholesteric liquid crystal polymer layers differing therefrom in helical pitch.

In terms of production efficiency of the plate having stable optical characteristics, the above-mentioned circularly polarized separated plate is advantageously produced by the above-mentioned method.

For obtaining the circularly polarized separated plate having reduced changes in color of transmitted light caused by visual angle changes, it is preferred that the cholesteric liquid crystal polymer layers are laminated with each other in the long-short order based on the center wavelength of reflected light.

As the cholesteric liquid crystal polymer layers, appropriate ones separating natural light into right circularly polarized light and left circularly polarized light by Grandjean orientation as transmitted light and reflected light can be used. The cholesteric liquid crystal polymer layer can be obtained as a monolayer product such as a film, or as a multilayer product in which it is supported with a plastic film or the like.

It is preferred that the cholesteric liquid crystal polymer layers are oriented as uniformly as possible. The uniformly oriented cholesteric liquid crystal polymer layers provide reflected light having no scattering, so that they are advantageous for the enlargement of the view angle in liquid crystal displays, particularly suitable for the formation of direct-view liquid crystal displays directly observed also from oblique directions.

In the circularly polarized separated plate according to the present invention, two or more cholesteric liquid crystal polymer layers are laminated with each other in which the upper layer is different from the lower layer in helical pitch, and this aims at the enlargement of the wavelength region of the separation function. That is to say, a monolayer cholesteric liquid crystal layer usually has a limitation on the wavelength region showing selective reflection (circularly polarized dichromatism), and the limitation is in a wide range extending to a wavelength region of about 100 nm in some cases. However, even such a wavelength range does not extend to the entire region of visible light desired when applied to liquid crystal displays. It is therefore aimed that the cholesteric liquid crystal layers different in selective reflection (reflection wavelength) are laminated with each other to enlarge the wavelength region showing the circularly polarized dichromatism.

By the way, several types of cholesteric liquid crystal polymer layers having a center wavelength of selective reflection ranging from 300 nm to 900 nm are laminated by using a combination of layers reflecting circularly polarized light in the same direction and differing in helical pitch, thereby being able to efficiently form a circularly polarized separated plate which can cover a wide wavelength region such as the visible light region. In this case, the lamination of the cholesteric liquid crystal layers reflecting the circularly polarized light in the same direction makes a phase state of circularly polarized light reflected by each layer uniform to prevent the generation of a different polarized state in each wavelength region and to increase the amount of polarized light in an available state.

There is no particular limitation on the cholesteric liquid crystal polymers for forming the circularly polarized separated plates, and appropriate polymers may be used. Accordingly, various polymers can be used such as main chain type or side chain type polymers in which conjugate linear atomic groups (mesogens) are introduced into main chains or side chains of the polymers. The cholesteric liquid crystal polymers having larger retardation ($\Delta n$) become wider in the wavelength region of selective reflection, and are preferably used in respect to a decrease in the layer number and allowance to a wavelength shift at a wide viewing angle. As the liquid crystal polymers, polymers having a glass transition temperature of 30 to 150° C. can be preferably used in terms of handling and stability of orientation at operating temperatures.

By the way, examples of the above-mentioned main chain type liquid crystal polymers include polymers such as polyesters, polyamides, polycarbonates and polyesterimides, in which mesogen groups comprising para-substituted cyclic compounds are linked by spacer moieties for giving flexibility if necessary.

Examples of the side chain type liquid crystal polymers include polymers having polyacrylates, polymethacrylates, polysiloxanes or polymalonates as main chains and low molecular weight liquid crystal compounds (mesogen groups) comprising para-substituted cyclic compounds as side chains through spacer moieties comprising conjugate linear atomic groups (mesogens) if necessary, nematic liquid crystal polymers containing low molecular weight chiralities, chiral component-introduced liquid crystal polymers, and mixed liquid crystal polymers of nematic and cholesteric polymers.

As described above, even the polymers having the para-substituted cyclic compounds imparting nematic orientation comprising para-substituted aromatic units or substituted cyclohexyl ring units such as azomethine, azo, azoxy, ester, biphenyl, phenylcyclohexane and bicyclohexane forms can be converted to polymers having cholesteric orientation by introducing appropriate chiral components comprising compounds having asymmetric carbon atoms or low molecular weight chiral agents (JP-A-55-21479 and U.S. Pat. No. 5,332,522). Terminal substituent groups at the para-positions of the para-substituted cyclic compounds may be appropriate groups such as cyano, alkyl and alkoxyl groups.

The spacer moieties include, for example, methylene chains —$(CH_2)_n$— and polyoxymethylene chains —$(CH_2CH_2O)_m$—. The number of repetition of structural units forming the spacer moieties is appropriately determined by the chemical structure of the mesogen moieties. In general, n is 0 to 20, and preferably 2 to 12, for the methylene chains, and m is 0 to 10, and preferably 1 to 3, for the polyoxymethylene chains.

The above-mentioned main chain type liquid crystal polymers can be prepared by appropriate methods based on ordinary polymer synthesis, for example, by copolymerizing component monomers by radical polymerization, cationic polymerization or anionic polymerization. The side chain type liquid crystal polymers can also be prepared by appropriate methods such as monomer addition polymerization of polymerizing by radical polymerization monomers in which mesogen groups are introduced into vinyl monomers for forming main chains such as acrylates or methacrylates by spacer groups if necessary, addition polymerization of vinyl-substituted mesogen monomers by Si—H bonds of polyoxymethyl-silylenes in the presence of platinum catalysts, introduction of mesogen groups by esterification using phase transfer catalysts through functional groups added to main polymers, and polycondensation of monomers in which mesogen groups are introduced into a part of malonic acid by spacer groups if necessary and diols.

In the above, copolymers comprising monomer units represented by the following general formula (a) and monomer units represented by the following general formula (b), particularly copolymers comprising 60% to 95% by weight of monomer units represented by the following general formula (a) and 40% to 5% of monomer units represented by the following general formula (b) are preferably used in terms of film forming properties, Grandjean orientation in a good monodomain state, orientation for a short period of time, stable fixing properties to the glass state, controllability of the helical pitch of cholesteric phases, and forming properties of circularly polarized separated plates which are thin, light, difficult to vary in the oriented state such as pitch with service temperatures, and excellent in durability and storage stability (Japanese Patent Application No. 7-251818).

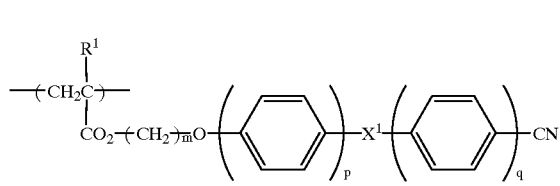

(a)

wherein $R^1$ represents hydrogen or a methyl group, m represents an integer of 1 to 6, $X^1$ represents a $CO_2$ group or an OCO group, and p and q each represents an integer of 1 or 2, satisfying p+q=3.

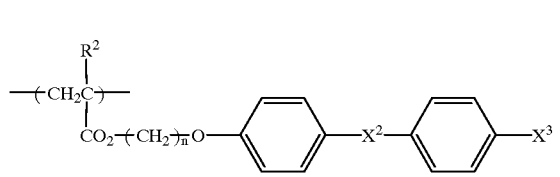

(b)

wherein $R^2$ represents hydrogen or a methyl group, n represents an integer of 1 to 6, $X^2$ represents a $CO_2$ group or an OCO group, and $X^3$ represents —CO—$R^3$ or $R^4$, wherein $R^3$ is

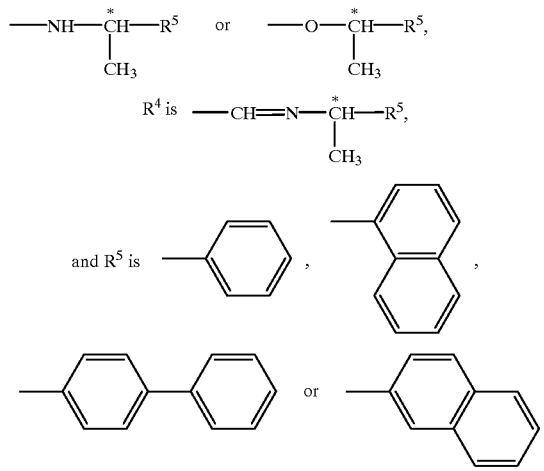

Acrylic monomers which can form the monomer units represented by the above-mentioned general formulas (a) and (b) can be synthesized by appropriate methods. Examples thereof include a method for obtaining a monomer by first heat refluxing ethylene chlorohydrin and 4-hydroxybenzoic acid in an aqueous alkali solution using potassium iodide as a catalyst to obtain a hydroxycarboxylic acid, then subjecting it to a dehydrating reaction with acrylic acid or methacrylic acid to obtain a (meth)acrylate, and esterifying the (meth)acrylate with 4-cyano-4'-hydroxybiphenyl in the presence of dicyclohexyl carbodiimide (DCC) and dimethyl-aminopyridine (DMAP).

Synthesis examples of acrylic monomers belonging to general formula (b) include a method of first heat refluxing a hydroxyalkyl halide and 4-hydroxybenzoic acid in an aqueous alkali solution using potassium iodide as a catalyst to obtain a hydroxycarboxylic acid, then subjecting it to a dehydrating reaction with acrylic acid or methacrylic acid to obtain a (meth)acrylate, and esterifying the (meth)acrylate with phenol having an $R^3$ group-containing CO group at the 4-position in the presence of DCC and DMAP, and a method of esterifying the (meth)acrylate with phenol having an asymmetric carbon atom at the 4-position in the presence of DCC and DMAP, after the above-mentioned dehydrating reaction.

Accordingly, other monomers belonging to the above-mentioned general formulas (a) and (b) can be synthesized in accordance with the above-mentioned methods using appropriate raw materials having desired introduced groups. The above-mentioned phenol having an $R^3$ group-containing CO group at the 4-position can be obtained, for example, by first reacting methyl chloroformate with 4-hydroxybenzoic acid in an aqueous alkali solution to obtain a carboxylic acid, converting it into an acid chloride using oxalyl chloride, reacting the acid chloride with H—$R^3$ in pyridine/tetrahydrofuran to introduce an $R^3$ group, and then treating the resulting product with aqueous ammonia to remove a protective group. Further, the phenol having an asymmetric carbon atom at the 4-position can be obtained, for example, by azeotropic dehydration of 4-hydroxybenzaldehyde and (S)-(-)-1-phenylethylamine in toluene.

The above-mentioned copolymers can be changed in the helical pitch of cholesteric liquid crystals by changing the content of the monomer units represented by general formula (b). Accordingly, the wavelength showing the circularly polarized dichromatism can be adjusted by controlling the content of the monomer units represented by general formula (b), and optical elements showing the circularly polarized dichromatism to light in the visible light region can be easily obtained.

The cholesteric liquid crystal polymer layers can be formed by methods based on the conventional orientation treatment. Examples of such methods include a method of developing a cholesteric liquid crystal polymer on an appropriate oriented film such as an oriented film obtained by rubbing with a rayon cloth a polyimide, polyvinyl alcohol, polyester, polyarylate, polyamideimide or polyether imide film formed on a support, an obliquely deposited layer or an oriented film obtained by the drawing treatment, followed by heating at a temperature equal to or higher than a glass transition temperature to lower than an isotropic phase transition temperature, and cooling the polymer to a temperature of lower than the glass transition temperature in a state in which liquid crystal polymer molecules are Grandjean-oriented to obtain a glass state, thereby forming a solidified layer in which the orientation is fixed.

As the above-mentioned supporting substrates, appropriate materials can be used which include monolayer or laminated films comprising plastics such as triacetyl cellulose, polyvinyl alcohol, polyimides, polyarylates, polyesters, polycarbonates, polysulfones, polyethersulfones, amorphous polyolefins, modified acrylic polymers and epoxy resins, and glass plates. The plastic films are preferred in respect to a decrease in thickness, and it is preferred that the retardation by birefringence is as small as possible in terms of an improvement in the efficiency for light utilization by prevention of changes in a polarized state.

The liquid crystal polymers can be developed, for example, by methods in which solutions of the liquid crystal polymers in solvents are developed in thin layers by appropriate methods such as spin coating, roll coating, flow coating, printing, dip coating, cast film formation, bar coating and gravure printing, followed by drying as needed. As the above-mentioned solvents, appropriate solvents such as methylene chloride, cyclohexanone, trichloroethylene, tetrachloroethane, N-methylpyrrolidone and tetrahydrofuran can be used.

The liquid crystal polymers can also be developed by methods in which heated melts of the liquid crystal polymers, preferably heated melts showing isotropic phases, are developed in accordance with the above, further developed in thin layers while maintaining the melting temperature if necessary, and then solidified. These methods use no solvents, and therefore provide hygienic working environment.

The heating treatment for orienting developed layers of the liquid crystal polymers can be conducted by heating the layers within the temperature range from the glass transition temperature to the isotropic phase transition temperature, namely within the temperature range in which the liquid crystal polymers exhibit liquid crystal phases, as described above. Further, the oriented state can be fixed by cooling the layers to less than the glass transition temperature, and there is no particular limitation on the cooling conditions. Usually, the above-mentioned heat treatment can be conducted at a temperature of 300° C. or less, so that the spontaneous cooling method is generally employed.

The solidified layers of the liquid crystal polymers formed on the supports can be used either as integrated with the supports or as films separated therefrom. When the solidified layers are used as integrated with the supports, the solidified layers of the liquid crystal polymers are laminated with each other in the close contact state, thereby obtaining the circularly polarized separated plates of the present invention. When the solidified layers are formed as integrated with the supports as described above, the retardation of the supports used is preferably as small as possible in respect to prevention of changes in the state of polarized light.

The thickness of each cholesteric liquid crystal polymer layer is preferably 0.5 to 50 $\mu$m, more preferably 1 to 30 $\mu$m, and most preferably 2 to 10 $\mu$m in terms of prevention of disorder of orientation and a reduction in transmittance. When the supports are contained, the total thickness including the supports is preferably 2 to 500 $\mu$m, more preferably 5 to 300 $\mu$m, and most preferably 10 to 200 $\mu$m. When the circularly polarized separated plates are formed, various additives such as stabilizers, plasticizers and metals can be added to the cholesteric liquid crystal polymers as needed.

The preferred circularly polarized separated plate according to the present invention comprises a close contact laminate of two or more cholesteric liquid crystal polymer layers in which an upper layer is different from a lower layer in helical pitch, said laminate having a mixed layer of cholesteric liquid crystal polymers forming the upper and lower layers, which is different from the upper and lower layers in helical pitch, in a close contact interface thereof to provide multistage changes in helical pitch in the direction of thickness.

The above-mentioned circularly polarized separated plate can be produced by heating the laminate (circularly polarized separated plate) of cholesteric liquid crystal polymers formed by the above-mentioned lamination coating procedure, heat pressing procedure or volatile liquid intervening procedure, at a temperature equal to or higher than a glass transition temperature to lower than an isotropic phase transition temperature, to form the mixed layer of cholesteric liquid crystal polymers forming the upper and lower layers in the close contact interface thereof.

In the above, the cholesteric liquid crystal polymer layers formed by mixing the cholesteric liquid crystal polymers of the upper and lower layers form the circularly polarized separated plate in which the upper layer is different from the lower layer in helical pitch to provide multistage changes in helical pitch in the direction of thickness. Usually, the helical pitch takes a mean value of those of the cholesteric liquid crystal polymers forming the upper and lower layers.

Accordingly, when the cholesteric liquid crystal polymer layers are used in such a combination that the wavelength region of the upper layer does not overlap with that of the lower layer, namely, in such a combination that the wavelength region of reflected light has a missing region due to discontinuity, the cholesteric liquid crystal polymer layers formed by mixing the upper and lower layers can fill up the above-mentioned missing region to make the wavelength of reflected light continuous. This means that the circularly polarized separated plate showing a wider wavelength region of reflected light can be formed by lamination of less cholesteric liquid crystal polymer layers.

Figure 3:
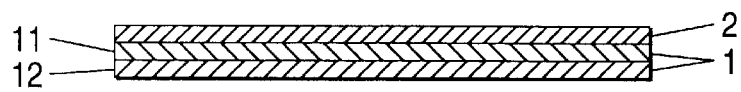
FIG. 3 is a cross sectional view showing one example of the optical element according to the present invention.

In the practical use of the circularly polarized separated plate according to the present invention, it can be used as an optical element in which one or two or more kinds of appropriate optical layers such as ¼ wavelength plates, polarizers and diffusing plates are disposed as shown in FIG. 3. In FIG. 3, a ¼ wavelength plate 2 is arranged.

In the circularly polarized separated plates which can be preferably used for formation of visual optical elements, the wavelength region of reflected light extends to 150 nm or more of the visible light region, preferably 180 nm or more, and more preferably 220 nm, to the whole visible light region.

In the above, when the cholesteric liquid crystal polymer layers are laminated with each other in the wavelength order of reflected light, the ¼ wavelength plate or a polarizer is preferably arranged on the side of the cholesteric liquid crystal polymer layer in which the center wavelength of reflected light utilized as the outgoing side of light is longest, for inhibition of changes in color described above.

The ¼ wavelength plate is arranged for changing the phase of circularly polarized light which goes out from the circularly polarized separated plate to convert it to a state rich in linearly polarized light components, thereby obtaining light easily transmittable through the polarizer. That is to say, in the above, it is possible to achieve indication by incidence of polarized light going out from the circularly polarized separated plate on a liquid crystal cell as such without use of the polarizer. However, use of the polarizer can improve the indication quality, so that the polarizer is used as needed. In this case, light higher in transmittance to the polarizer is more advantageous for luminous indication, and its transmittance becomes higher as linearly polarized light components in the polarized light direction agreeing with the polarization axis (transmitting axis) are more contained. Accordingly, for that purpose, polarized light going out from the circularly polarized separated plate is linearly polarized through the ¼ wavelength plate.

As the ¼ wavelength plate, therefore, a plate is preferably used which can form much linearly polarized light from circularly polarized light going out from the circularly polarized separated plate corresponding to the retardation of the ¼ wavelength, and can convert light of another wavelength to elliptically polarized light having an major axis direction in a direction as parallel as possible to the above-mentioned linearly polarized light and as close to the linearly polarized light as possible.

The ¼ wavelength plates can be formed of appropriate materials and preferred are ones transparent and giving an uniform retardation. In general, retardation plates are used. The retardation given by the ¼ wavelength plates can be appropriately determined according to the wavelength region of circularly polarized light going out from the circularly polarized separated plates. By the way, in the visible light region, the retardation plates can be preferably used which give a small retardation, preferably a retardation of 100 to 180 nm and more preferably 110 to 150 nm, in terms of the wavelength range and the conversion efficiency.

The retardation layers are colored by the viewing angle in some cases, and for preventing this coloring, the ¼ wavelength plates of ellipsoids can be preferably used in which $N_z$ defined by the equation $(n_x-n_z)/(n_x-n_y)$ satisfies $N_z \leq 1.1$. In the above-mentioned equation, $n_x$ means a maximum refractive index in a plane of a retardation layer, $n_y$ means a refractive index in a direction crossing at right angles to $n_x$, and $n_z$ means a refractive index in a thickness direction.

The ¼ wavelength plate can be formed as a retardation plate of one layer or a laminate of two or more retardation plates. In the case of the retardation plate of one layer, smaller wavelength dispersion of birefringence can preferably more homogenize the polarized state for every wavelength. On the other hand, the lamination of the retardation plates is effective for the enlargement of the wavelength range in which it functions as the desired ¼ wavelength plate, and combinations thereof may be appropriately determined according to the wavelength region and the like.

When two or more retardation plates are combined for the visible light region, it is preferred for obtaining much linearly polarized light components that a layer or layers giving a retardation of 100 to 180 nm are contained as an odd number of layers. It is preferred for improving the wavelength characteristics that layers other than the layer(s) giving a retardation of 100 to 180 nm are usually comprised of layers, for example, giving a retardation of 200 nm or more, but they are not limited thereto. For obtaining the above-mentioned lamination type ¼ wavelength plates in which the coloring by the viewing angle is prevented, a laminate of the retardation plate giving a ¼ wavelength retardation satisfying $N_z \leq 1.1$ and one or more retardation plates giving a ½ wavelength retardation is preferably used.

As described above, the ¼ wavelength plates are obtained as the monolayer retardation plates or the laminates, and for example, retardation films are used for formation of the retardation plates. The retardation films can be obtained as polymer films appropriately uniaxially or biaxially oriented and liquid crystal polymer films. As the polymer films and the liquid crystal polymer films, appropriate ones can be used.

By the way, specific examples of the above-mentioned polymer films include films formed of transparent plastics such as polycarbonates, polyesters, polysulfones, polyethersulfones, polyvinyl alcohol, polystyrene, polymethyl methacrylate, polyolefins such as polypropylene, cellulose acetate polymers, polyvinyl chloride, polyarylates and polyamides.

In the present invention, a polarizer can also be further arranged on the ¼ wavelength plate to form an optical element. In this case, for prevention of absorption loss, the polarizer is preferably arranged so that the polarization axis (transmitting axis) thereof agrees with the polarizing direction of the linearly polarized light through the ¼ wavelength plate as closely as possible.

As the above-mentioned polarizers, appropriate plates such as oriented polyene films such as dehydrated products of polyvinyl alcohol and dehydrochloric acid treated products of polyvinyl chloride can be used, but hydrophilic polymer films such as polyvinyl alcohol films, partially formalized polyvinyl alcohol films and partially saponified ethylene-vinyl acetate copolymer films, which are allowed to adsorb iodine and/or dichroic dyes and oriented, can be preferably used from the viewpoint of optical performances such as the degree of polarization. The polarizer may be one in which one or both sides of such a polarizing film may be covered with a transparent protective layer or layers.

A diffusing layer or layers are optionally provided on a one side or both sides of the circularly polarized separated plate for converting a travelling direction of light, leveling the outgoing light to inhibit the light-and-shadow unevenness, and preventing the occurrence of glistening visibility by moire due to the interference with picture elements when it is applied to a liquid crystal cell. In terms of maintenance of the polarized state of light going out from the circularly polarized separated plate, the retardation of the diffusing layer(s) is 30 nm or less, and preferably 0 to 20 nm, based on vertical incident light having a wavelength of 633 nm, preferably incident light having an incident angle of 30 degrees or less.

The diffusing layer can be appropriately formed as a coating layer or a diffusing sheet on the circularly polarized separated plate or the ¼ wavelength plate by any methods such as surface roughening methods by sand blasting or chemical etching, craze generation methods by mechanical stresses or solvent treatments and transfer formation methods using molds provided with specific diffusing structures. With respect to the diffusing layer(s), one or more layers can be arranged on appropriate positions, for example, on one side or both sides of the circularly polarized separated plate, between the ¼ wavelength plate and the polarizer of the optical element, and on upper surfaces thereof.

Figure 4:
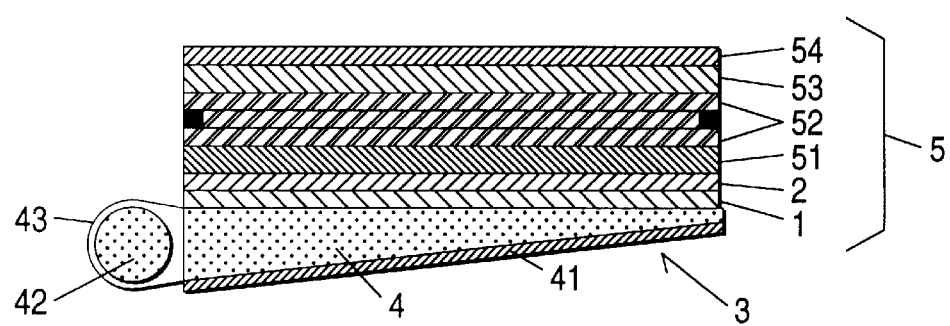
FIG. 4 is a cross sectional view showing one example of the liquid crystal display according to the present invention.

The circularly polarized separated plates and the optical elements according to the present invention can be preferably used for fabrication of polarized light sources and liquid crystal displays. An embodiment thereof is shown in FIG. 4. FIG. 4 shows a liquid crystal display 5, and the reference numeral 3 designates a polarized light source device. According to such a polarized light source device, light going out from a light conductive plate 4 is incident on a circularly polarized separated plate 1 arranged on the outgoing face side of the light pipe which allows incident light from a side face thereof to go out from one of upper and lower faces thereof, one of right circularly polarized light and left circularly polarized light is transmitted and the other is reflected, and the reflected light is incident on the light pipe again as return light. The light incident on the light pipe again is reflected at a reflection function portion comprising a reflecting layer 41 arranged on the lower face thereof and incident on the circularly polarized separated plate 1 again, resulting in re-separation into transmitted light and reflected light (which is further incident again).

Accordingly, the above-mentioned re-incident light as the reflected light is confined between the circularly polarized separated plate and the light pipe, and reflection is repeated until it becomes specified circularly polarized light transmittable through the circularly polarized separated plate. In the present invention, however, it is preferred with respect to the efficiency for re-incident light utilization that the light goes out by as small a number of repetitions as possible, especially that the initial re-incident light goes out without repetition of reflection.

As the above-mentioned light pipe, an appropriate one can be used in which incident light from a side face goes out from one of upper and lower faces. Such a light pipe can be obtained, for example, as one in which a light outgoing face or a back face thereof of a transparent or translucent resin plate is provided with a diffuser in the dot or stripe form, or one in which an uneven structure, particularly a fine prism array-like uneven structure, is given to the back face of the resin plate.

Accordingly, the light pipe comprises a tabular material having the upper and lower faces one of which acts as a outgoing face, and an incident face composed of at least one side end face between the upper and lower faces. An example thereof is a side light type back light known in a liquid crystal display, in which a linear light source such as a (cold or hot) cathode tube or a light source 42 such as a light emitting diode is arranged on the side face of a light pipe 4, and light transmitted through the light pipe goes out from the surface side of the plate by diffusion, reflection, diffraction and interference, as shown in FIG. 4.

For introducing the circularly polarized light incident again through the circularly polarized separated plate to the lower face while maintaining the circularly polarized state thereof good without the influence of retardation, and allowing the return light reflected at the lower face to go out while maintaining the circularly polarized state thereof good, the light pipe in which the retardation by birefringence in a thickness direction is as small as possible, preferably 30 nm or less and more preferably 0 to 20 nm can be preferably used.

The above-mentioned light pipe allowing light to go out from the one face side can have the function that the plate itself converts the polarization of light reflected by the circularly polarized separated plate. However, the provision of the reflecting layer 41 on the back face of the light pipe can prevent reflection loss almost completely. The reflecting layer such as a diffusion reflecting layer or a mirror reflecting layer is excellent in the function to convert the polarization of light reflected by the circularly polarized separated plate, so that it is preferably used in the present invention. By the way, in the diffusion reflecting layer represented by the uneven surface, the polarized state is randomly mixed based on its diffusion to substantially cancel the polarized state. Further, in the mirror reflecting layer represented by a deposited layer of aluminum or silver, a resin plate provided therewith or a metal surface comprised of metal foil, the polarized state is reversed by reflection of the circularly polarized light.

In the fabrication of the light pipe, a prism sheet for controlling the outgoing direction of light, a diffusing plate for obtaining uniform light emission, a reflecting means for returning leakage light, and an auxiliary means such as a light source holder 43 for guiding outgoing light from a linear light source to the side face of the light pipe are arranged on specified positions in one or more layers as an appropriate combination if necessary. Dots given to the prism sheet or the diffusing plate arranged on the surface side (light outgoing side) of the light pipe or given to the light pipe can function as a polarization-converting means changing the phase of reflected light by the diffusion effect.

In the liquid crystal display 5 shown in FIG. 4, the above-mentioned polarized light source device 3 is used in a back light system. The reference numeral 51 designates a lower polarizer, 52 designates a liquid crystal cell, 53 designates an upper polarizer and 54 designates a diffusing plate. The lower polarizer 51 and the diffusing plate 54 are optionally provided, and can also be applied as the optical element in which they are laminated with the circularly polarized separated plate as described above. The polarized light source device using the circularly polarized separated plate or the optical element according to the present invention is excellent in the efficiency for light utilization to provide luminous light, and form the liquid crystal display which is easily increased in area, luminous and excellent in visibility.

Liquid crystal displays are generally fabricated by appropriately assembling constituent parts such as liquid crystal cells functioning as liquid crystal shutters, and driving devices, polarizers, back lights and optional retardation plates for compensation attached thereto. In the present invention, there is no particular limitation, except that the above-mentioned circularly polarized separated plates, optical elements or polarized light source devices are used, and the liquid crystal display can be produced in accordance with conventional methods. In particular, direct-view liquid crystal displays can be preferably formed.

Accordingly, there is no particular limitation on the liquid crystal cells to be used, and appropriate ones can be used. In particular, the circularly polarized separated plates, optical elements or polarized light source devices can be preferably used for liquid crystal cells on which light in the polarized state is incident for indication, such as cells using twist nematic liquid crystals or super twist nematic liquid crystals. However, they can also be used for liquid crystal cells using non-twist liquid crystals, guest host liquid crystals in which dichroic substances are dispersed, or ferroelectric liquid crystals. There is also no particular limitation on the driving system of the liquid crystals.

In the fabrication of the liquid crystal display, appropriate optical elements such as a diffusing plate, an anti-glare layer, a reflection reducing film, a protective layer and a protective plate provided on the polarizer on the visual side, or a retardation plate for compensation provided between the liquid crystal cell and the polarizer can be appropriately arranged.

The above-mentioned retardation plate for compensation is provided for compensating the wavelength dependence of birefringence to improve the visibility. In the present invention, it is arranged between the polarizer on the visual side and/or the back light side and the liquid crystal cell as needed. As the retardation plate for compensation, an appropriate retardation plate can be used according to the wavelength region, and it may be formed in one layer or as a laminated layer of tow or more layers. The retardation plates for compensation can be obtained as the oriented films exemplified with respect to the above-mentioned ¼ wavelength plates.

In the present invention, the optical elements and parts forming the above-mentioned polarized light source devices and liquid crystal displays may be wholly or partially integrated by lamination and adhered to one another, or separably arranged. In the fabrication of the liquid crystal displays, the polarized light source devices are preferably used which supply outgoing light excellent in vertical and parallel properties, give out again light which has been incident again through the circularly polarized separated layers, in a state where loss and changes in angle due to scattering are decreased and in good agreement with a direction of the initial outgoing light, and efficiently supply outgoing light in a direction effective for improvement of visibility.

The present invention is described in more detail by reference to the following examples, but it should be understood that the invention is not construed as being limited thereto.

EXAMPLE 1

Figure 5:
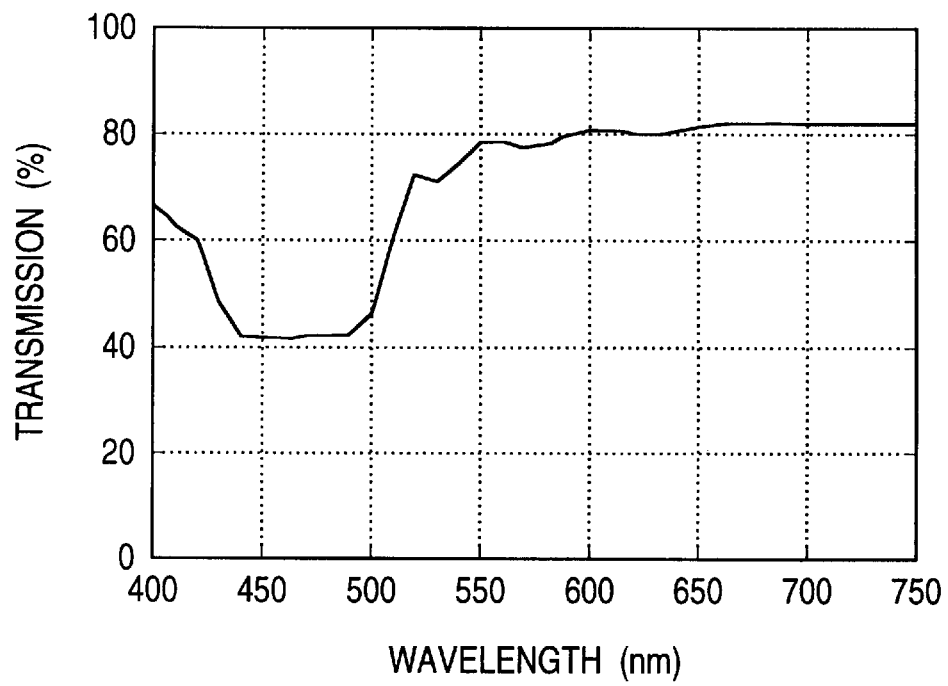
FIG. 5 is a graph showing a transmission characteristic of a cholesteric liquid crystal polymer layer in Example 1.

A solution of 20% by weight of an acrylic thermotropic side chain type liquid crystal polymer having a glass transition temperature of 84° C. and an isotropic phase transition temperature of 210° C. and showing a cholesteric structure between the above-mentioned temperatures in tetrahydrofuran was applied onto a surface of a 80 μm thick cellulose triacetate film with a wire bar, the surface of which has been rubbing-treated with polyvinyl alcohol (about 0.1 μm in thickness). After heat orientation at 160° C. for 5 minutes, the coated film was cooled at room temperature to form a cholesteric liquid crystal polymer layer having a thickness of 4 μm. This layer reflected left circularly polarized light of blue light having a wavelength of 430 to 500 nm as a mirror surface, and the transmission characteristic thereof is shown in FIG. 5.

Figure 6:
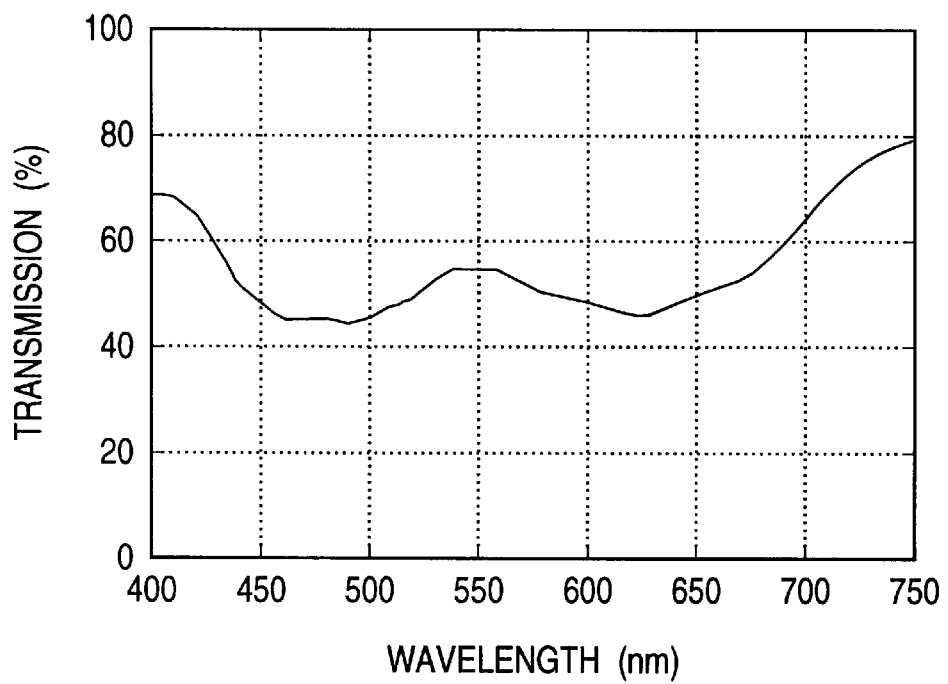
FIG. 6 is a graph showing a transmission characteristic of another cholesteric liquid crystal polymer layer in Example 1.

Then, a solution of 20% by weight of an acrylic thermotropic side chain type liquid crystal polymer having a glass transition temperature of 90° C. and an isotropic phase transition temperature of 235° C. and showing a cholesteric structure between the above-mentioned temperatures, which was only different from the above-mentioned liquid crystal polymer in the asymmetric carbon group ratio, in tetrahydrofuran was applied onto the above-mentioned cholesteric liquid crystal polymer layer with a wire bar. After air-dry with cold air, heat orientation was conducted at 150° C. for 2 minutes, followed by cooling at room temperature to fix the orientation of the liquid crystal polymer into a glass state, thereby obtaining a circularly polarized separated plate composed of a laminate comprising the above-mentioned cholesteric liquid crystal polymer layer and a newly formed 4 μm thick cholesteric liquid crystal polymer layer adhered thereto in a close contact state. The transmission characteristic of this close contact laminate is shown in FIG. 6 and the laminate reflected left circularly polarized light having a wavelength of about 430 to about 520 nm and left circularly polarized light having a wavelength of about 570 to about 670 nm as a mirror surface.

EXAMPLE 2

Figure 7:
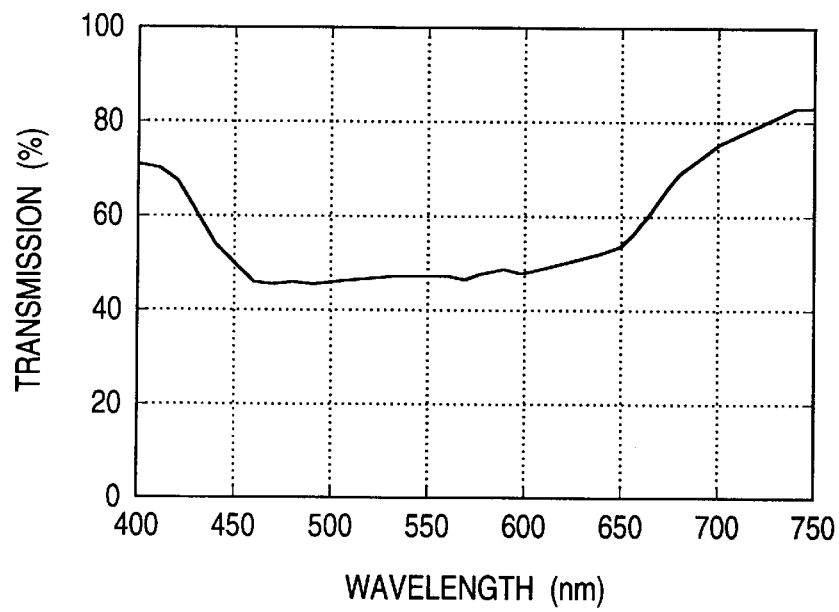
FIG. 7 is a graph showing a transmission characteristic of the circularly polarized separated plate obtained in Example 2.
Figure 8:
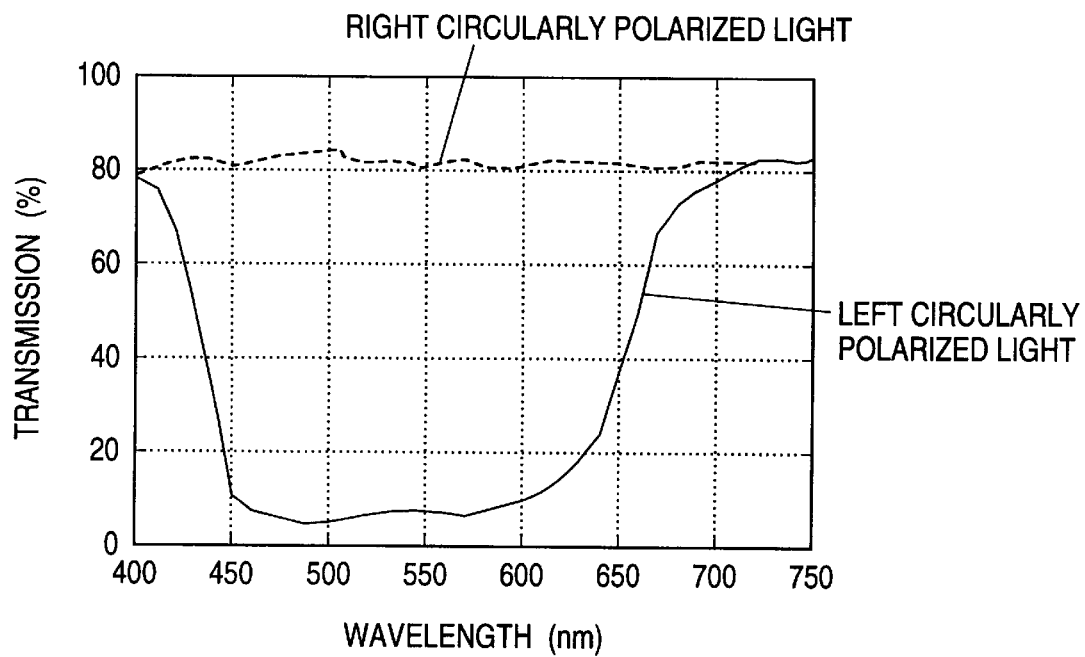
FIG. 8 is a graph showing a transmission characteristic of right circularly polarized light and left circularly polarized light of a circularly polarized separated plate obtained in Example 2.

The circularly polarized separated plate obtained in Example 1 was heated at 130° C. for 15 minutes, and then, cooled at room temperature to obtain a circularly polarized separated plate. The transmission characteristic thereof is shown in FIG. 7, and the plate reflected left circularly polarized light having a wavelength of 440 to 660 nm as a mirror surface. The transmission characteristic of right circularly polarized light and left circularly polarized light is shown in FIG. 8. The mixing of the cholesteric liquid crystal polymers of the upper and lower layers in the close contact interface thereof by the heat treatment was judged by continuation of changes in helical pitch by TEM cross section observation.

EXAMPLE 3

A solution of 20% by weight of an acrylic thermotropic cholesteric liquid crystal polymer in tetrahydrofuran was applied onto a surface of a 80 μm thick cellulose triacetate film with a wire bar, the surface of which has been rubbing-treated with polyvinyl alcohol (about 0.1 μm in thickness). After heat orientation at 160° C. for 5 minutes, the coated film was cooled at room temperature to form a 5 μm thick cholesteric liquid crystal polymer layer in which the orientation of the liquid crystal polymer was fixed into a glass state. This layer reflected left circularly polarized light of blue light having a wavelength of 380 to 450 nm as a mirror surface.

Then, using a cholesteric liquid crystal polymer which was only different from the above-mentioned liquid crystal polymer in the asymmetric carbon group ratio, a cholesteric liquid crystal polymer layer was formed based on the above-mentioned method. This cholesteric liquid crystal polymer layer reflected left circularly polarized light of red light having a wavelength of 650 to 750 nm as a mirror surface.

Thereafter, the two cholesteric liquid crystal polymer layers obtained above were placed one over the other, and introduced between laminating rolls heated at 130° C. to obtain a circularly polarized separated plate composed of a laminate in which the cholesteric liquid crystal polymer layers were laminated with each other in the close contact state. The reflection characteristics of this close contact laminate were substantially the sum of the above-mentioned characteristics of the two cholesteric liquid crystal polymer layers used.

EXAMPLE 4

The circularly polarized separated plate obtained in Example 3 was heated at 130° C. for 10 minutes, and then, cooled at room temperature to obtain a circularly polarized separated plate. This reflected left circularly polarized light having a wavelength of 400 to 700 nm as a mirror surface. The mixing of the cholesteric liquid crystal polymers of the upper and lower layers in the close contact interface thereof by the heat treatment was judged by continuation of changes in helical pitch by TEM cross section observation.

EXAMPLE 5

Two cholesteric liquid crystal polymer layers obtained based on the method in Example 3 were coated with ethanol, placed one over the other, introduced between laminating rolls at room temperature, and dried at 50° C. for 3 minutes to obtain a circularly polarized separated plate composed of a laminate in which the cholesteric liquid crystal polymer layers were laminated with each other in the close contact state. The reflection characteristics of this close contact laminate were substantially the sum of the above-mentioned characteristics of the two cholesteric liquid crystal polymer layers used.

EXAMPLE 6

The circularly polarized separated plate obtained in Example 5 was heated at 150° C. for 3 minutes, and then cooled at room temperature to obtain a circularly polarized separated plate. This reflected left circularly polarized light having a wavelength of 400 to 700 nm as a mirror surface. The mixing of the cholesteric liquid crystal polymers of the upper and lower layers in the close contact interface thereof by the heat treatment was judged by continuation of changes in helical pitch by TEM cross section observation.

EXAMPLE 7

A circularly polarized separated plate composed of a laminate in which the cholesteric liquid crystal polymer layers were laminated with each other in the close contact state was obtained in accordance with Example 5 with the exception that ethanol was added to a solution of 20% by weight of an acrylic thermotropic cholesteric liquid crystal polymer in tetrahydrofuran obtained based on Example 3 to prepare a solution having a solid content of 1% by weight, and the resulting solution was applied to surfaces of the liquid crystal polymer layers. The reflection characteristics of this close contact laminate were substantially the sum of the above-mentioned characteristics of the two cholesteric liquid crystal polymer layers used.

EXAMPLE 8

A circularly polarized separated plate was obtained in accordance with Example 6 with the exception that the circularly polarized separated plate obtained in Example 7 was used. This reflected left circularly polarized light having a wavelength of 400 to 700 nm as a mirror surface. The mixing of the cholesteric liquid crystal polymers of the upper and lower layers in the close contact interface thereof by the heat treatment was judged by continuation of changes in helical pitch by TEM cross section observation.

While the invention has been described in detail and with reference to specific embodiments thereof, it will be apparent to one skilled in the art that various changes and modifications can be made therein without departing from the spirit and scope thereof.

What is claimed is:

1. A method for producing a circularly polarized separated plate which comprises coating an oriented cholesteric liquid crystal polymer layer with a different kind of cholesteric liquid crystal polymer that is different from the cholesteric liquid crystal polymer of the oriented layer only in that it has a different ratio of optically active carbon, and heat orienting the resulting coated layer, thereby forming a close contact laminate of two or more cholesteric liquid crystal polymer layers in which an upper layer is different from a lower layer in helical pitch.

2. The method as claimed in claim 1, wherein the oriented cholesteric liquid crystal polymer layer has a mirror reflection fraction in reflected light of 60% or more.

3. The method as claimed in claim 1 or 2, wherein the different kind of cholesteric liquid crystal polymer that is different from the cholesteric liquid crystal polymer of the oriented layer is applied as a solution having a concentration of 10 to 50%.

4. The method as claimed in claim 3, wherein the coated layer of the different kind of cholesteric liquid crystal polymer is dried with air having a temperature of 30° C. or less to reduce the residual solvent amount to 20% or less, and then subjected to a heat orientation treatment.

5. The method as claimed in claim 1 or 2, wherein the coated layer of the different kind of cholesteric liquid crystal polymer is dried with air having a temperature of 30° C. or less to reduce the amount of a residual solvent to 20% or less, and then subjected to a heat orientation treatment.

6. A method for producing a circularly polarized separated plate which comprises heat pressing oriented cholesteric liquid crystal polymer layers on each other or adhering oriented cholesteric liquid crystal polymer layers to each other through a volatile liquid or a volatile liquid in which a cholesteric liquid crystal polymer is dissolved, wherein the cholesteric liquid crystal polymers of the polymer layers are different from each other only in that they have a different ratio of optically active carbon, thereby forming a close contact laminate of two or more cholesteric liquid crystal polymer layers in which an upper layer is different from a lower layer in helical pitch.

7. The method as claimed in claim 6, wherein the adhering procedure by heat pressing is conducted at a temperature equal to or higher than a glass transition temperature of the cholesteric liquid crystal polymer.

8. The method as claimed in claim 6, wherein the volatile liquid is a low-soluble volatile liquid in which the solubility of the cholesteric liquid crystal polymer is 20% or less by weight.

9. A method for producing a circularly polarized separated plate comprising a close contact laminate containing at least three cholesteric liquid crystal polymer layers, including a lower layer, an upper layer which is different from the lower layer in helical pitch, and a mixed layer of cholesteric liquid crystal polymers forming the upper and lower layers, which is different from the upper and lower layers in helical pitch, said mixed layer being between the upper and lower layers and forming a close contact interface with the lower and upper layers to provide multistage changes in helical pitch in the direction of thickness, wherein the circularly polarized separated plate obtained by the method according to claim 1 or 6 is heated at a temperature equal to or higher than a glass transition temperature to lower than an isotropic phase transition temperature to form a mixed layer of the cholesteric liquid crystal polymers forming the upper and lower layers.

10. A circularly polarized separated plate comprising a direct close contact laminate of two or more cholesteric liquid crystal polymer layers in which an upper layer is different from a lower layer in helical pitch, and in which the cholesteric liquid crystal polymers of the polymer layers are different from each other only in that they have a different ratio of optically active carbon.

11. The circularly polarized separated plate as claimed in claim 10, wherein the cholesteric liquid crystal polymer layers different in helical pitch are layers in which the wavelength region of reflected light of the upper layer does not overlap with that of the lower layer.

12. A circularly polarized separated plate comprising a close contact laminate containing at least three cholesteric liquid crystal polymer layers, including a lower layer, an upper layer which is different from the lower layer in helical pitch, and a mixed layer of cholesteric liquid crystal polymers forming the upper and lower layers, which is different from the upper and lower layers in helical pitch, said mixed layer being between the upper and lower layers and forming a close contact interface with the lower and upper layers to provide multistage changes in helical pitch in the direction of thickness.

13. The circularly polarized separated plate as claimed in claim 10, 11, or 12, wherein the wavelength region of reflected light is a wavelength region of 150 nm or more of the visible light region.

14. An optical element in which the circularly polarized separated plate according to claim 10, 11, or 12 is provided with at least one of a ¼ wavelength plate and a polarizer.

15. A polarization light source device comprising the optical element according to claim 14 on a light outgoing side of a light pipe.

16. A liquid crystal display comprising the optical element according to claim 14 on a visual back face side of a liquid crystal cell.

17. A polarization light source device comprising the circularly polarized separated plate according to claim 10, 11 or 12, on a light outgoing side of a light pipe.

18. A liquid crystal display comprising a polarization light source device according to claim 17 on a visual back face side of a liquid crystal cell.

19. A liquid crystal display comprising the circularly polarized separated plate according to claim 10, 11 or 12.

20. A circularly polarized separated plate according to claim 12, wherein the cholesteric liquid crystal polymers of the polymer layers are different from each other only in that they have a different ratio of optically active carbon.

* * * * *